United States Patent [19]

Torguet

[11] 3,731,231
[45] May 1, 1973

[54] ACOUSTO-OPTICAL MODULATOR SYSTEMS
[75] Inventor: Roger Torguet, Paris, France
[73] Assignee: Thomason-CSF, Paris, France
[22] Filed: Ap. 20, 1971
[21] Appl. No.: 135,658

[30] Foreign Application Priority Data
Ap. 24, 1970    France..............................7015106

[52] U.S. Cl.................................332/7.51, 350/160
[51] Int. Cl...............................................H01s 3/10
[58] Field of Search..................332/7.51; 350/160 R, 350/161

[56] References Cited
UNITED STATES PATENTS
3,637,288   2/1972   Seidel..................................350/161
3,649,105   3/1972   Treuthart............................350/161
3,565,514   2/1971   Bate et al. ..........................350/161
3,552,825   1/1971   Wellerock..........................350/161

Primary Examiner—Benjamin A. Borchelt
Assistant Examiner—N. Moskowitz
Attorney—Cushman, Darby & Cushman

[57] ABSTRACT

The present invention relates to acousto-optical modulators systems which enable the luminous intensity of a beam of parallel coherent monochromatic light to be spatially modulated.

The modulator comprises a block of birefringent material and means for exciting therein a plurality of ultrasonic parallel pencils capable of selectively reflecting the refracted portion of an incident light beam.

9 Claims, 4 Drawing Figures

ACOUSTO-OPTICAL MODULATOR SYSTEMS

The present invention relates to light-modulators which are capable of converting a parallel beam of monochromatic light into a heterogeneous beam which, within its cross section, presents several distinct areas whose luminous intensities have dissimilar values. This kind of spatial modulation can be obtained, in particular, by intercepting a parallel light beam of uniform intensity by an opaque mask out of which an aperture of arbitrary shape has been cut. However, when it is required to optically modulate a beam in order to display a large number of shapes in rapid succession, the method of employing a set of interchangeable masks no longer suffices. This case occurs in particular where it is desired to display or print conventional symbols under the control of electrical signals supplied by a data-processing system.

The use of liquid crystal electro-optical modulators, has been envisaged in the context of the generation of symbols patterns by means of a mosaic of appropriate modulating cells. However, the response time of these systems is still too long to achieve the desired rate of display or printing.

According to the present invention there is provided an acousto-optical modulator system for spatially modulating a parallel beam of coherent energy under the control of electrical modulating signals, said system comprising : a block of birefringent material having at least one reflective face, a plurality of ultrasonic transducers positioned on said face, electrical means for causing said transducers to selectively radiate within said block and under the control of said signals parallel pencils of ultrasonic energy along a direction perpendicular to said face, refracting means for causing said parallel beam to propagate within said block along a direction opposite to said direction and for receiving upon reflection on said face scattered radiant energy portions resulting from the interaction of said parallel beam with said pencils of ultrasonic energy ; the respective wave numbers $\vec{k}_i$, $\vec{k}_d$, and $\vec{K}$ of the waves corresponding to said parallel beam, scattered energy portions and ultrasonic energy, satisfying substantially the vector relation $\vec{k}_i = \vec{k}_d \pm \vec{K}$.

For a better understanding of the invention and to show how the same may be carried into effect, reference will be made to the following description and drawings among which :

Figure 1:
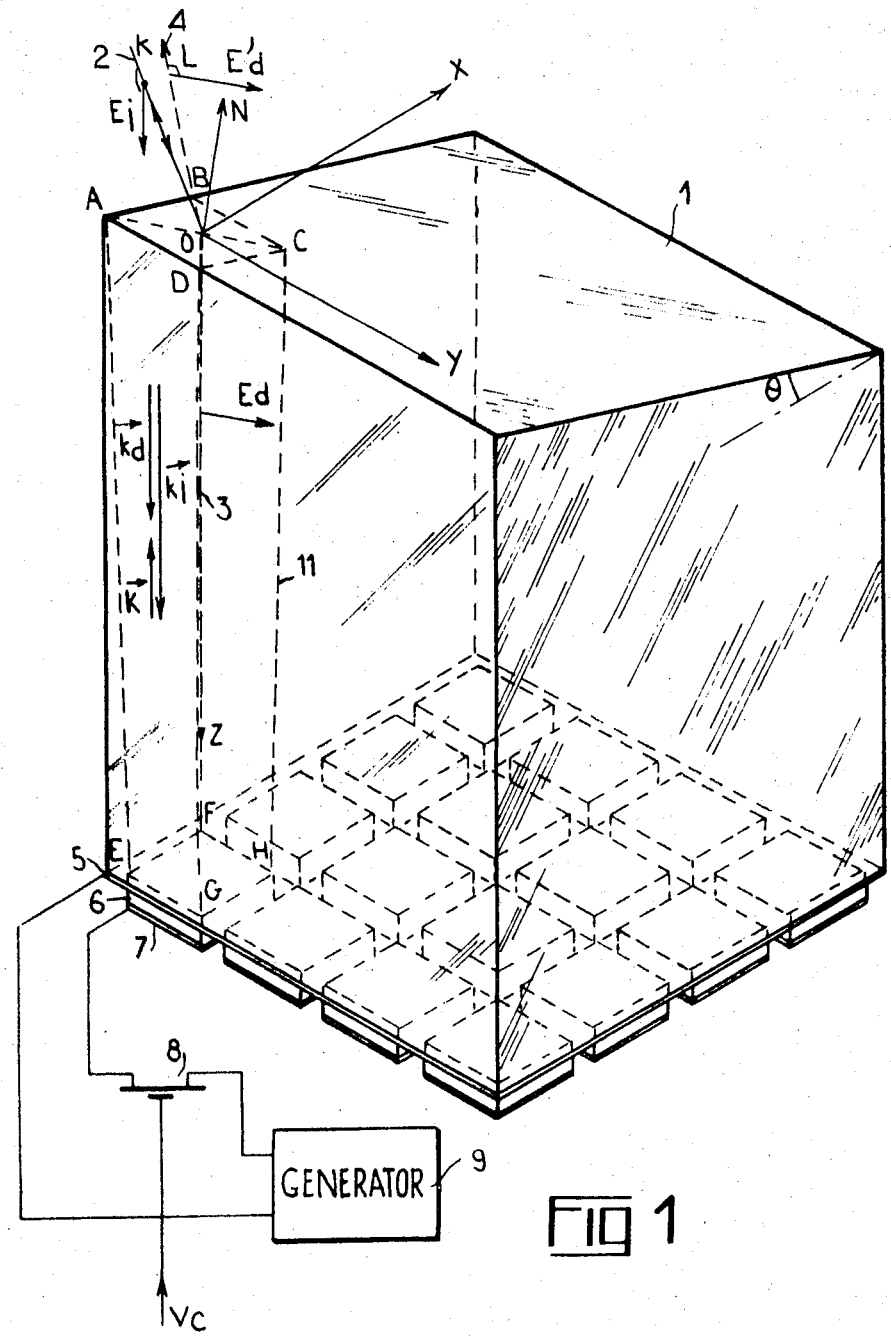
FIG. 1 illustrates an isometric view of a first embodiment of the modulator in accordance with the invention.

FIG. 1 shows a block 1 of a birefringent material having a vertical axis OZ and a flat base parallel to the plane X O Y of the trirectangular trihedron OXYZ. By way of a non-limitative example, the block 1 is cut so that its principal directions of oscillation coincide with the bisectors of the axes OX and OY. The base of the block 1 is coated with a conductive electrode 5 the top face of which is reflective. Below the electrode 5 there is attached a mosaic of electromechanical transducers ; one of these transducers incorporates, in addition to the common electrode 5, a piezoelectric wafer 6 and a second electrode 7. The electrodes 5 and 6 are connected by a control-conduction element 8, to a high frequency generator 9. Under the influence of a control voltage $V_c$ applied to the control electrode of the element 8 (field effect transistor) the transducer 5, 6, 7 is supplied with electrical excitation which causes it to radiate a vertical ultrasonic beam into the block 1. The energy of said beam is contained in the volume 11 whose base is defined by the top face EFGH of the transducer and its top by the portion ABCD of the top surface of the block 1. The top surface of the block 1 is inclined through an angle $\theta$ in relation to the plane XOY and is supplied obliquely with a parallel beam 2 of coherent monochromatic light ; this light beam is represented in FIG. 1 by one of its rays KO and by its electrical vector $\vec{E}_i$. The angle of incidence of the ray KO vis-a-vis the normal ON to the top face of the block 1, is such that it refracts through the interior of the block 1 parallel to the axis OZ.

In FIG. 1, by way of example, the vector $\vec{E}_i$ has been orientated perpendicular to the plane of incidence KON and parallel to that principal direction of the double refracting medium which corresponds to the highest index. The refracted light wave progresses vertically in the direction of the ultrasonic wave produced by the transducer 5, 6, 7 ; the wave numbers are represented by $\vec{k}_i$ in the case of the light wave and by $\vec{K}$ in the case of the acoustic wave. Experience shows that the interaction within the birefringent medium, between the waves having the wave numbers $\vec{k}_i$ and $\vec{K}$, gives rise to a scattered light wave 3 having an electrical vector $\vec{E}_d$ orientated in accordance with that principal direction of the double-refracting medium which is at an angle with the vector $\vec{E}_i$. The scattered light wave induced by the ultrasonic vibrations, has a wave number $\vec{k}_d$ which satisfies the following vector relationship :

$$\vec{k}_i = \vec{k}_d \pm \vec{K}$$

where $\vec{k}_i = \omega i/C'$ ; $\vec{k}_d = \omega d/C''$ ;

$K = \Omega/v_s$ $\omega i$ and $C'$ being respectively the optical frequency and the phase velocity of the refracted incident light wave.

$\omega_d$ and $C''$ are respectively the optical frequency and the phase velocity of the scattered light wave.

$\Omega$ and $v_s$ are respectively the ultrasonic frequency and phase velocity of the acoustic wave in the birefringent medium.

The refracted wave 3 propagates through the block 1 in the same direction as the incident wave ; the two light waves thus experience reflection at the bottom face of the block 1 and ascend again parallel to OZ. Since the phase velocities $C'$ and $C''$ differ from one another, the wave having the electrical vector $\vec{E}_i$ emerges from the block 1 in the direction OK while the other light wave emerges in the direction OL. An observer can therefore observe the ray OL of the induced light wave, separately, provided that the transducer radiates the ultrasonic wave. The transducer and the double-refracting medium behave like a mirror whose refracted power is zero in the absence of any ultrasonic excitation and high in the presence of said excitation. The induced optical reflection effect occurs inside the section of the ultrasonic beam ; this section corresponds substantially to the radiating area EFGH of the transducer since the transverse dimensions of the transducer are substantially in excess of the wavelength of the ultrasonic waves propagating through the block 1. It can be seen from FIG. 1 that several transducers are provided in such a manner that the ultrasonic beams they emit do not overlap each other. This design makes it possible to spatially modulate the light wave by exciting certain transducers in the mosaic, in order to form the luminous pattern of a letter or numeral. The top face of the block 1 makes an angle $\theta$ with the mosaic, in order to form the luminous pattern of a letter or numeral. The top face of the block 1 makes an angle $\theta$ with the base so that the reflected ultrasonic waves are deviated from a trajectory parallel to OZ ; in this fashion, interaction of the reflected ultrasonic beams is prevented. Experience shows that the duration of the interaction required in order to refract the major part of the light wave will be in the order of 1 microsecond if the electrical power of excitation of a mosaic of 35 transducers is set at 1 watt. This typical duration fixes the height of the block 1 since the velocity $v_s$ of the ultrasonic waves is known.

By way of a non-limitative example, the block 1 can be cut from a quartz crystal as also can the transducer wafer 6. A light wave of wavelength $\lambda = 0.6328$ microns will conveniently be reflected by utilizing an A.C. generator 9 whose frequency is around 48 MHz.

The velocity of propagation of the ultrasonic wave being much smaller than that of the light, the radiant frequency $\Omega$ of the voltage produced by the alternating generator is readily obtained. The optical frequency $\omega_d$ of the scattered light wave and the optical frequency $\omega_i$, are known from the choice of the light source.

The selection of the birefringent material fixes $C'$, $C''$ and $v_s$, and by applying the preceding formulas, the radiant frequency $\Omega$ can be readily derived. The optical modulator in FIG. 1 operates whatever the type of ultrasonic wave emitted but experience shows that it is advantageous to utilize ultrasonic shear waves. The foregoing numerical example corresponds to the case in which $\vec{k_i} = \vec{k_d} - \vec{K}$ applies, as in FIG. 1, but the device can operate equally well in other cases, as long as the general vector relationship $\vec{k_i} = \vec{k_d} \pm \vec{K}$ is satisfied by other combinations of aligned wave numbers $\vec{k_i}$, $\vec{k_d}$ and $\vec{K}$.

Figure 4:
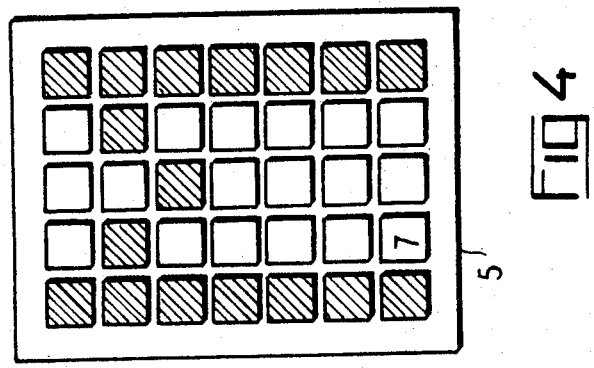
FIG. 4 is an explanatory diagram.

The optical modulator of FIG. 1 associated with a laser, makes it possible to form light characters as the plan view of FIG. 4 illustrates. This FIGURE illustrates a mosaic of transducers made out of seven rows and 5 columns, in FIG. 4, the electrode 5 and the electrodes 7 which indicate the positions of the transducers can be seen, the cross-hatched squares indicating those of the transducers which would be radiating in order to form an illuminated letter M. It goes without saying that the number, shape and design of the transducers can differ substantially from the schematic diagram of FIG. 4.

Figure 2:
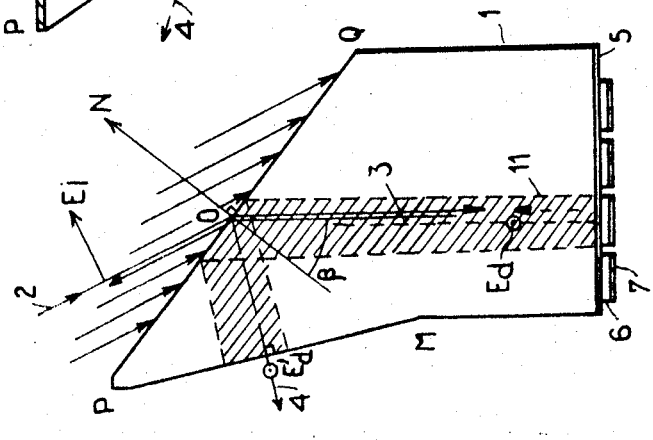
FIG. 2 represents an elevational view of the first variant embodiment of the device shown in FIG. 1.

In FIG. 2 a first variant embodiment of the modulator of FIG. 1 can be seen. In this elevational view, the same references have been used as in FIG. 1, one of the ultrasonic beams having been shaded in order to illustrate the path it takes inside the block 1. The top of the block 1 has an oblique entry face PQ and an oblique exit face PM. The angle $\beta$ which the normal ON makes with the vertical is the Brewster angle ; the vector $\vec{E_i}$ of the incident light beam is in the plane of incidence ; the scattered light beam has its electrical vector $\vec{E_d}$ normal to the plane of incidence and parallel to one of the principal directions of the birefringent material. The incident wave is refracted within the block 1 in the vertical direction and, after reflection at the face 5, follows the reverse trajectory, exiting through the face PQ ; the lightwave induced by the ultrasonic beam which has its electrical vector $\vec{E_d}$ located outside the plane of incidence, undergoes reflection at the face PQ and emerges from the block 1 through the face PM. The variant embodiment shown in FIG. 2 offers the advantage of completely separating the light beam 2 from the scattered beam 4 since there is an entry face PQ and an exit face PM. It can be seen from FIG. 2 that the ultrasonic beam comprises a vertical portion 11 which participates in the interaction with the light, and an oblique portion which plays no parts in this interaction.

Figure 3:
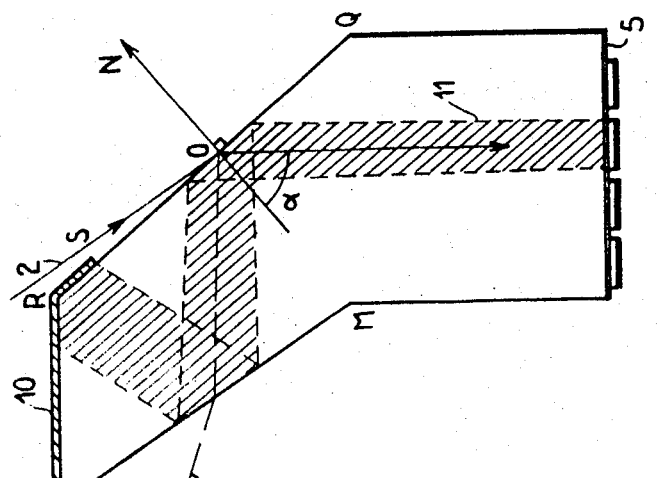
FIG. 3 represents an elevational view of a second variant embodiment of the device in FIG. 1.

In FIG. 3, a variant embodiment similar to that in FIG. 2 can be seen in which however separation between the light beams is based upon the limiting angle of refraction. The top of the block 1 is made up of an entry face RQ which receives the incident light beam 2 at an acute angle, an exit face PM from which the scattered beam 4 emerges, and a face PR coated with a substance 10 capable of absorbing the ultrasonic energy. The angle $\alpha$ has a value which is less than the limiting angle of refraction of the beam 2 but exceeds the limiting angle of refraction of the scattered beam 4. This explains why the beam 2 penetrates by refraction into the block 1 while the scattered beam 4 can only leave the block through the face PM after reflection of the face RG. One of the ultrasonic beams has been cross-hatched in FIG. 3 in order to show that it experiences two successive reflections before being absorbed by the layer 10 which extends between the points P and S. Only the portion 11 of the ultrasonic beam is actively involved in the interaction process with the light.

What I claim is :

1. Acousto-optical modulator system for spatially modulating a parallel beam of coherent energy under the control of electrical modulating signals, said system comprising : a block of birefringent material, having at least one reflective face, a plurality of ultrasonic transducers positioned on said face, electrical means for causing said transducers to selectively radiate within said block and under the control of said signals parallel pencils of ultrasonic energy along a direction perpendicular to said face, refracting means for causing said parallel beam to propagate within said block along a direction opposite to said direction and for receiving upon reflection on said face scattered radiant energy portions resulting from the interaction of said parallel beam with said pencils of ultrasonic energy ; the respective wave numbers $\vec{k_i}$, $\vec{k_d}$ and $\vec{K}$ of the waves corresponding to said parallel beam scattered energy portions and ultrasonic energy, satisfying substantially the vector relation $\vec{k_i} = \vec{k_d} \pm \vec{K}$.

2. Modulator system as claimed in claim 1, wherein said refracting means comprise a further face of said block receiving said parallel beam at oblique incidence ; said block having an exit face transmitting the scattered radiant energy portions emerging from said further face.

3. Modulator system as claimed in claim 2, wherein said parallel beam impinges onto said further face at the Brewster incidence.

4. Modulator system as claimed in claim 2, wherein said parallel beam impinges onto said further face at a grazing incidence lying between the limiting incidences for total reflection upon said birefringent material.

5. Modulator system as claimed in claim 1, wherein said ultrasonic transducers are shear wave transducers.

6. Modulator system as claimed in claim 1, further comprising means for absorbing said ultrasonic energy.

7. Modulator system as claimed in claim 1, wherein said electrical means comprise an ultrasonic A.C. generator having an electrical output, and switching means coupling said transducers to said electrical output : said switching means having control inputs for receiving said electrical modulating signals.

8. Modulator system as claimed in claim 1, wherein said transducers build up a mosaic capable of selectively displaying characters in response to said electrical modulating signals.

9. Modulator system as claimed in claim 7, wherein said switching means are unipolar semiconductor devices.

* * * * *